(12) United States Patent
Ando (10) Patent No.: US 9,275,549 B2
(45) Date of Patent: Mar. 1, 2016

(54) VEHICLE PSEUDO-TRAVEL LOCUS GENERATOR

(71) Applicant: DENSO CORPORATION, Kariya, Aichi-pref. (JP)

(72) Inventor: Motonori Ando, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 30 days.

(21) Appl. No.: 14/088,735

(22) Filed: Nov. 25, 2013

(65) Prior Publication Data

US 2014/0148994 A1 May 29, 2014

(30) Foreign Application Priority Data

Nov. 28, 2012 (JP) ................................. 2012-260043

(51) Int. Cl.
  *G08G 1/00* (2006.01)
(52) U.S. Cl.
  CPC ........................................ *G08G 1/22* (2013.01)
(58) Field of Classification Search
  None
  See application file for complete search history.

(56) References Cited

U.S. PATENT DOCUMENTS

| | | | | |
|---|---|---|---|---|
| 6,301,530 B1* | 10/2001 | Tamura | ................ | G05D 1/024 180/168 |
| 2002/0163450 A1* | 11/2002 | Flick | ...................... | B60R 25/04 340/988 |
| 2006/0161341 A1* | 7/2006 | Haegebarth | ............. | G08G 1/20 701/117 |
| 2010/0256852 A1* | 10/2010 | Mudalige | ................. | G08G 1/22 701/24 |
| 2013/0030606 A1* | 1/2013 | Mudalige | ................. | G08G 1/22 701/2 |
| 2013/0090802 A1* | 4/2013 | Curtis | ................... | G05D 1/024 701/25 |
| 2013/0279392 A1* | 10/2013 | Rubin | ................. | H04W 72/005 370/312 |

FOREIGN PATENT DOCUMENTS

| | | | | |
|---|---|---|---|---|
| JP | 2001-006100 | | 1/2001 | |
| JP | 2006260000 A | * | 9/2006 | ............... G05D 1/00 |
| JP | 2011-075474 | | 4/2011 | |

OTHER PUBLICATIONS

Office Action dated Feb. 17, 2015 in corresponding Japanese Application No. 2013-245205.

* cited by examiner

*Primary Examiner* — John R Olszewski
*Assistant Examiner* — Jess Whittington
(74) *Attorney, Agent, or Firm* — Harness, Dickey & Pierce, P.L.C.

(57) ABSTRACT

An in-vehicle apparatus and method generates a pseudo-travel locus that is used to perform a driving support control. The in-vehicle apparatus has a pseudo-locus generator for generating the pseudo-travel locus of a subject vehicle and a communication controller for controlling a transmitter to transmit the pseudo-travel locus of the subject vehicle. The pseudo-travel locus is generated from a travel locus of a lead vehicle and a current position of the subject vehicle. Therefore, a portion of the travel locus of the subject vehicle is similar to an actual travel locus of the subject vehicle. Thus, when the pseudo-travel locus is transmitted as a travel locus of the subject vehicle, nearby vehicles may perform a driving support control based on the pseudo-travel locus of the subject vehicle. As a result, the actual travel locus of the subject vehicle is not disclosed.

18 Claims, 7 Drawing Sheets

VEHICLE INFO

| CURRENT STATUS INFO | | | |
|---|---|---|---|
| (TIME, LONGITUDE, LATITUDE, BEARING ANGLE, ALTITUDE, SPEED) | | | |
| APPARATUS ID | | | |
| PH INFO | PH1 | LATITUDE DIFFERENCE | LONGITUDE DIFFERENCE | ※ DIFFERENCE BTWN CURRENT POSITION AND POINT A |
| | PH2 | LATITUDE DIFFERENCE | LONGITUDE DIFFERENCE | ※ DIFFERENCE BTWN POINT A AND POINT B |
| | ⋮ | | | |
| | PHn | | | |

VEHICLE PSEUDO-TRAVEL LOCUS GENERATOR

CROSS-REFERENCE TO RELATED APPLICATION

The present application is based on and claims the benefit of priority of Japanese Patent Application No. 2012-260043 filed on Nov. 28, 2012, the disclosure of which is incorporated herein by reference.

TECHNICAL FIELD

The present disclosure generally relates to an in-vehicle apparatus and method for providing a locus-based driving support control.

BACKGROUND

A vehicle may be equipped with an in-vehicle apparatus having a transmitter and a receiver for wirelessly communicating with other vehicles. A patent document 1 (i.e., Japanese Patent No. 3457577) discloses a technique in which a lead vehicle transmits its own position information and performs a driving support control on a follower vehicle that is based on its own position information.

The technique of patent document 1 also utilizes a travel locus of a nearby vehicle to provide the driving support control. A nearby vehicle may be a vehicle traveling close to or within a nearby area of a subject vehicle. When a travel locus of one of several nearby vehicles is compared with a travel locus of the subject vehicle, a distance between the two vehicles in a lateral direction may be calculated. Further, various determinations may be performed by utilizing such a distance, such as, whether the nearby vehicle is traveling in the same lane as the subject vehicle, whether the subject vehicle can safely pass the nearby vehicle, or the like.

However, transmitting the travel locus of the subject vehicle to the nearby vehicle may cause personal privacy concerns for the driver of the subject vehicle. For example, it may be possible for the transmitted travel locus of the subject vehicle to be used to recall or track destinations of recent/past travel. Some drivers may not wish to disclose such information.

SUMMARY

It is an object of the present disclosure to provide an in-vehicle apparatus and method that allows a nearby vehicle to perform a locus-based drive support control based on a travel locus of a subject vehicle without transmitting an actual travel locus of the subject vehicle.

In an aspect of the present disclosure, an in-vehicle apparatus performs a locus-based travel support control of a subject vehicle based on an actual travel locus of the subject vehicle. The in-vehicle apparatus includes a transmitter that transmits a travel locus of the subject vehicle, a receiver that receives a travel locus of a nearby vehicle from among a plurality of nearby vehicles, and a position obtainer that obtains a current position of the subject vehicle. The in-vehicle apparatus also includes a lead vehicle recognizer that recognizes one of the plurality of nearby vehicles as a lead vehicle, a first pseudo-locus generator that generates a pseudo-travel locus of the subject vehicle based on (i) a travel locus of the lead vehicle that is received by the subject vehicle, and (ii) the current position of the subject vehicle, and a communication controller that transmits the pseudo-travel locus of the subject vehicle as the travel locus of the subject vehicle through the transmitter.

As described above, a pseudo-travel locus of the subject vehicle is generated and transmitted in the present disclosure. The pseudo-travel locus of the subject vehicle is included in the vehicle information as a travel locus of the subject vehicle. Since the pseudo-travel locus is generated based on a travel locus of a lead vehicle and the current position of the subject vehicle, a portion of the pseudo-travel locus around/near the current position of the subject vehicle is generated as a travel locus that is similar to an actual travel locus of the subject vehicle. Therefore, even when the pseudo-travel locus is included in the vehicle information as a travel locus of the subject vehicle and such vehicle information is transmitted to the nearby vehicles, each of the nearby vehicles may perform a driving support control based on the pseudo travel locus of the subject vehicle. Further, the subject vehicle is not obliged to transmit its own actual travel locus.

BRIEF DESCRIPTION OF THE DRAWINGS

Other objects, features and advantages of the present disclosure may become more apparent from the following detailed description disposed with reference to the accompanying drawings, in which.

DETAILED DESCRIPTION

Figure 1:
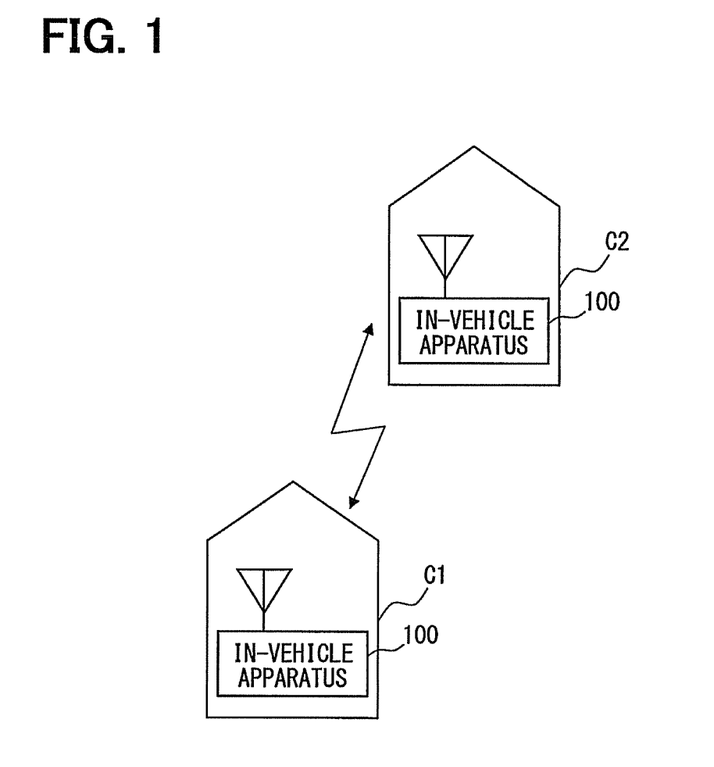
FIG. 1 is an illustration of communicating in-vehicle apparatuses in an embodiment of the present disclosure.

An embodiment of the present disclosure is described with reference to FIGS. 1-8. As shown in FIG. 1, an in-vehicle apparatus 100 of the present disclosure is disposed in two or more vehicles, such as vehicles C1 and C2. The in-vehicle apparatus 100 transmits vehicle information of a vehicle Cx which has the in-vehicle apparatus 100 disposed therein (hereinafter the subject vehicle). The in-vehicle apparatus 100 transmits serially (i.e., sequentially or in a consecutive order of the vehicles toward the lead vehicle) to a compass of the subject vehicle, and receives vehicle information which is transmitted from the other in-vehicle apparatus 100 that is disposed in other vehicle. Although details of the vehicle information are mentioned later, the vehicle information includes a travel locus of the subject vehicle, a current position (i.e., latitude and longitude) of the subject vehicle, and an apparatus ID of the in-vehicle apparatus 100.

Figure 2:
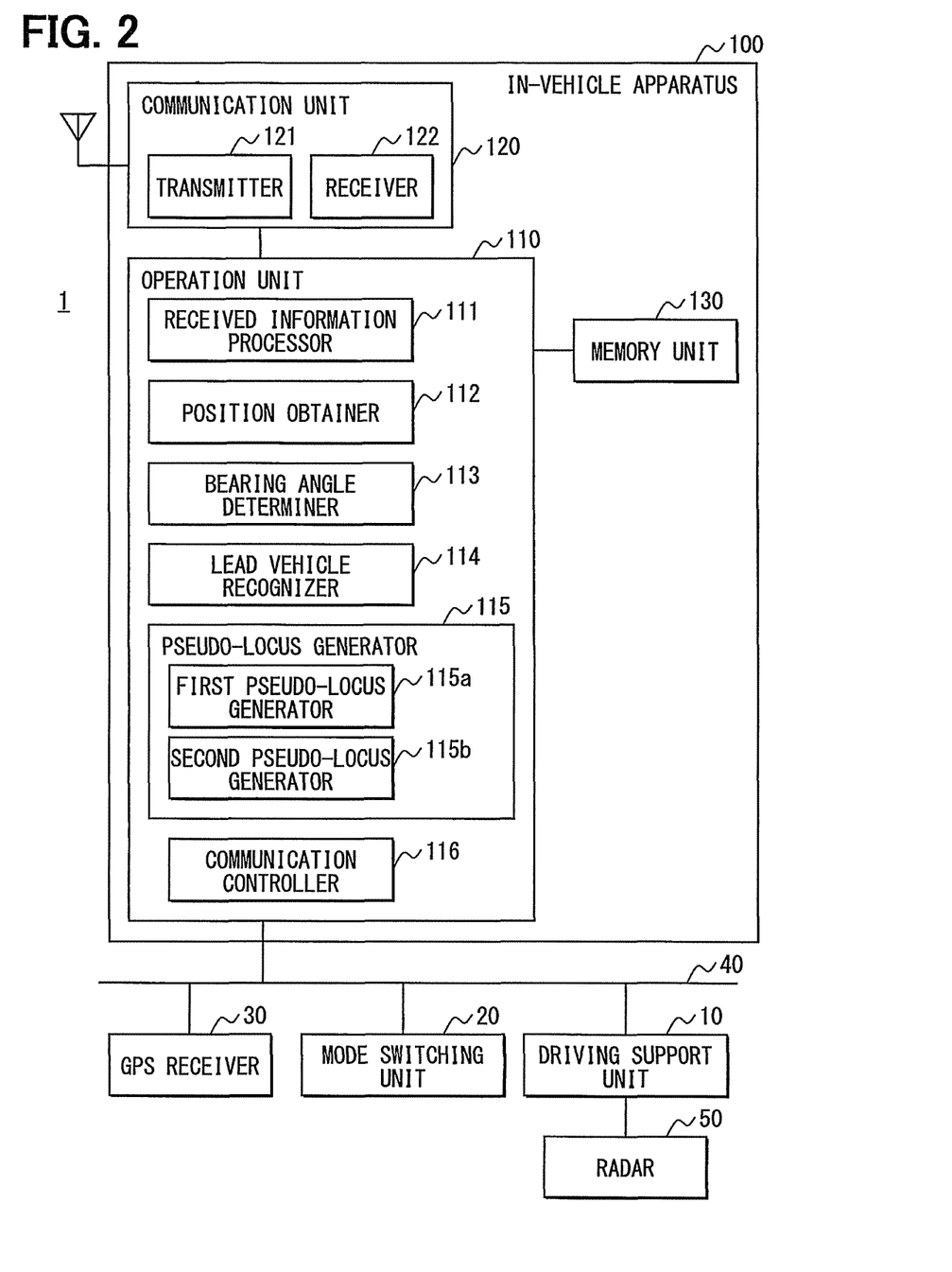
FIG. 2 is a block diagram of a vehicle drive support system including the in-vehicle apparatus.

As shown in FIG. 2, a schematic diagram of a vehicle drive support system 1 is disposed in each respective vehicle, for example, and each of such vehicles has a driving support unit 10, a mode switching unit 20, and a GPS receiver 30 connected to the in-vehicle apparatus 100 through a CAN 40. Further, the driving support unit 10 is connected to a radar 50.

The driving support unit 10 performs a driving support control of a vehicle in which the vehicle drive support system 1 is disposed. The driving support control may be a control that utilizes a travel locus transmitted from a nearby vehicle. For example, a travel locus of the subject vehicle may be compared with a travel locus of a lead vehicle, which is chosen from among many nearby vehicles, for recognizing an amount of shift of the subject vehicle in a vehicle width direction relative to the travel locus of the lead vehicle. Then, by controlling a following vehicle to have a smaller amount of shift in the vehicle width direction, the following vehicle follows the lead vehicle. According to such control, even when the lead vehicle travels along a curved road, the following vehicle is enabled to follow the lead vehicle. Further, based on the amount of shift described above, it may also be possible to perform a control that determines whether the subject vehicle comes into contact with the lead vehicle when the subject vehicle overtakes and passes the lead vehicle. Further, the driving support unit 10 may also perform a process which serially (i.e., sequentially) calculates an inter-vehicle distance r(radar) by using the radar 50. The inter-vehicle distances between vehicles may be calculated serially or in a sequential order, that is, in a consecutive order of the vehicles toward the lead vehicle.

The mode switching unit 20 is a device that is operated by a driver of the subject vehicle. The mode switching unit 20 allows a user/driver to switch the operation of the in-vehicle apparatus 100 between either (i) a pseudo-locus mode which is discussed below or (ii) an actual locus mode. The GPS receiver 30 receives a signal transmitted from a GPS satellite, and serially (i.e., sequentially) calculates coordinates of the current position based on the received signal. Such a coordinates determination cycle may occur every 200 milliseconds, for example.

The radar 50 emits electromagnetic waves in a narrow beam angle towards a frontal field of the subject vehicle. If an object is positioned in front of the subject vehicle, the electromagnetic waves will be reflect from the object. The emission control of the electromagnetic waves is performed by the driving support unit 10 in the present embodiment, and a signal that indicates a detection of the reflected wave is provided for the driving support unit 10. The radar 50 may be implemented as a millimeter wave radar or a laser radar, for example. During a travel of the subject vehicle, an object detected immediately in front and within the frontal field of the subject vehicle by the radar 50 is determined to be a vehicle (i.e., a lead vehicle). Therefore, an object detected by the radar 50 is considered as a lead vehicle.

The in-vehicle apparatus 100 has an operation unit 110, a communication unit 120, and a memory unit 130. The operation unit 110 has a CPU which performs various kinds of data processing, ROM, and flash memory for storing data processing programs and the like. The operation unit 110 also has RAM which functions as a workspace of an operation. In addition, the operation unit 110 also has an input/output interface for performing a data exchange with external devices, and a bus for the connection to the external devices. The operation unit 110 functions, according to an execution of the ROM-stored programs or the like by the CPU, as a received information processor 111, a position obtainer 112, a bearing angle determiner 113, a lead vehicle recognizer 114, a pseudo-locus generator 115, and a communication controller 116. Further, the pseudo-locus generator 115 includes a first pseudo-locus generator 115a and a second pseudo-locus generator 115b.

The memory unit 130 has a writable memory medium to which contents to be memorized are writable. The memory medium serially (i.e., sequentially) memorizes multiple components of the current position of the subject vehicle. The communication unit 120 has a transmitter 121 for transmitting the vehicle information provided by the operation unit 110 to a compass of the subject vehicle after modulating and amplifying the vehicle information. The vehicle information is transmitted by a broadcast method. Further, the communication unit 120 also has a receiver 122 for receiving the vehicle information transmitted by the in-vehicle apparatus 100 of a nearby vehicle. The communication unit 120 outputs the received vehicle information after demodulating or decoding the received vehicle information.

The received information processor 111 sends the vehicle information of the other vehicle, which is received by the communication unit 120, to the driving support unit 10. The position obtainer 112 obtains the current position of the subject vehicle that is determined by the GPS receiver 30, and stores it to the memory unit 130. The bearing angle determiner 113 serially (i.e., sequentially) determines a bearing angle of the subject vehicle. The bearing angle may be determined by, for example, (i) a travel direction is determined based on the current positions that are serially (i.e., sequentially) obtained by the position obtainer 112, and (ii) the bearing angle is determined based on a travel direction. Further, the bearing angle may be determined based on a signal from a gyro sensor (not illustrated).

Figure 3:
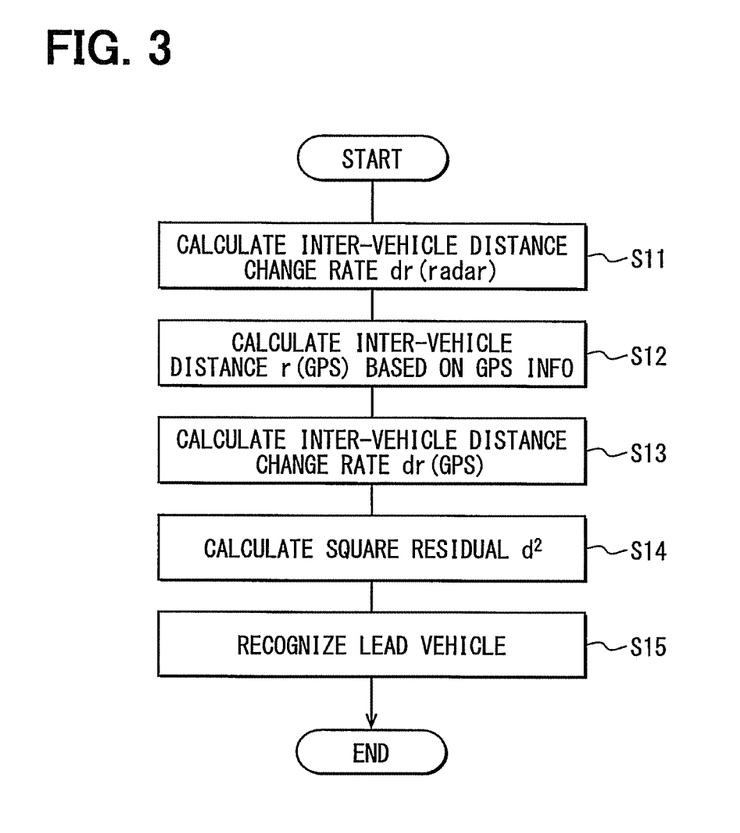
FIG. 3 is a flowchart of a lead vehicle recognition process.

The lead vehicle recognizer 114 performs a process shown in FIG. 3. In Step S11, the driving support unit 10 calculates an inter-vehicle distance change rate dr(radar) based on an inter-vehicle distance r(radar) that is serially (i.e., sequentially) calculated by the driving support unit 10.

In Step S12, a difference between (i) the current position of the nearby vehicle and the subject vehicle is calculated. More specifically, a difference between (i) the current position (i.e., in latitude and longitude) that is included in the vehicle information of the nearby vehicle and obtained from the communication unit 120 and (ii) the current position (i.e., in latitude and longitude) obtained from the GPS receiver 30 of the subject vehicle is calculated. A calculation result of such difference is used as an inter-vehicle distance r(GPS) of the subject vehicle and the nearby vehicle. When the vehicle information has been obtained from two or more nearby vehicles, the inter-vehicle distance r(GPS) to each of those vehicles is calculated. Further, the identity of multiple pieces of the vehicle information is determined (i.e., whether the multiple information pieces have been transmitted from only one vehicle, or from respectively different vehicles), based on a device ID included in the vehicle information. The inter-vehicle distance r(GPS) calculated for each of the multiple vehicles is memorized in the memory unit 130.

In Step S13, the inter-vehicle distance change rate dr(GPS) is calculated for each of the multiple vehicles by using the inter-vehicle distance r(GPS) periodically calculated and memorized, by performing the above-mentioned Step S12.

In Step S14, a square residual $d^2$ is calculated for each of the multiple nearby vehicles by an Equation 1 in the following. The square residual $d^2$ is an index that collectively represents (i) a difference between the inter-vehicle distance r(radar) and the inter-vehicle distance r(GPS), (ii) a difference between the inter-vehicle distance change rate dr(radar) and the inter-vehicle distance change rate dr (GPS), and (iii) a length of a lateral offset LatOffset. The lateral offset LatOffset is a value that represents the length of a lateral distance of a nearby vehicle relative to a line that represents a travel direction of the subject vehicle, which is calculated based on GPS information and a bearing angle.

$$d^2 = (y-x)^T \sum^{-1} (y-x) \quad \text{(Equation 1)}$$

$$\sum\nolimits^{-1} = \begin{pmatrix} s_{11} & s_{12} & s_{13} \\ s_{21} & s_{22} & s_{23} \\ s_{31} & s_{32} & s_{33} \end{pmatrix}$$

$$x = \begin{pmatrix} r_{RADAR} \\ dr_{RADAR} \\ 0 \end{pmatrix}$$

$$y = \begin{pmatrix} r_{GPS} \\ dr_{GPS} \\ LatOffset \end{pmatrix}$$

In Step S15, it is determined whether there is any vehicle information which has a value of the square residual $d^2$ calculated in the above-mentioned Step S14 being equal to or less than a predetermined threshold. If there is no vehicle information having a square residual $d^2$ value below an under-threshold square residual value, it is determined that no lead vehicle is being recognized as a lead vehicle. On the other hand, when there is vehicle information having a square residual $d^2$ value below an under-threshold square residual value, the vehicle transmitting such vehicle information is recognized as a lead vehicle. However, more practically, since the vehicle information does not include a vehicle ID, the identification of the lead vehicle may also be performed by using a device ID of the in-vehicle apparatus 100, which is disposed in the lead vehicle. The identification of the lead vehicle may be performed based only on the square residual $d^2$, but may also be performed in a process of Step S15, by additionally taking other determination criteria into consideration, such as (i) whether the travel direction of a vehicle is the same as the subject vehicle, and (ii) whether the vehicle information has been obtained at a certain threshold interval or at a shorter interval.

Figure 4:
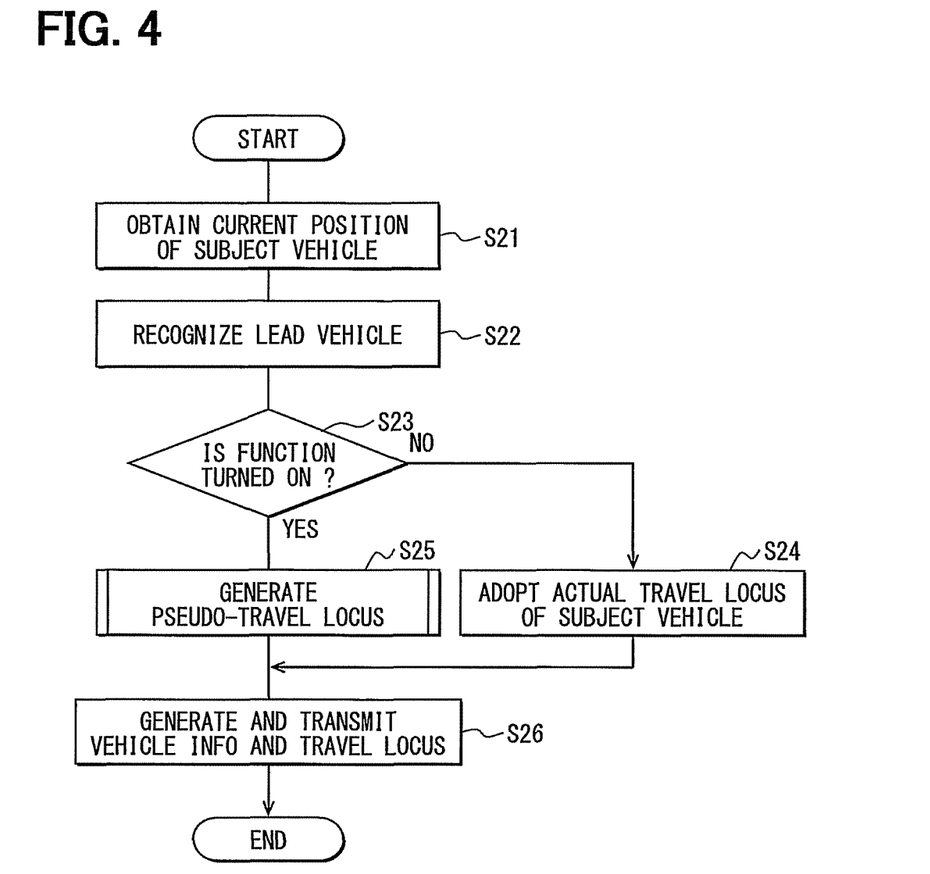
FIG. 4 is a flowchart of a process of a pseudo-locus generator, a communication controller, and a process of an operation unit.

With reference to FIG. 4, a process performed by the pseudo-locus generator 115 and the communication controller 116 is explained. FIG. 4 is a flowchart of a process of the pseudo-locus generator 115 and the communication controller 116. Also, a process of the operation unit 110 is relevant to the former process of the units 115, 116. The process shown in FIG. 4 is performed at the above-mentioned coordinates determination cycle, for example.

Step S21 is a process by the position obtainer 112 for obtaining the current position of the subject vehicle from the GPS receiver 30. The obtained current position is memorized to the memory unit 130. Step S22 is a process of the lead vehicle recognizer 114 for recognizing and identifying a lead vehicle.

In Step S23, it is determined whether a pseudo-travel locus generation function is set to ON. In other words, it is determined whether the system 1 is in a pseudo-locus mode or in an actual locus mode. In the present embodiment, the pseudo-locus mode may be started when the mode switching unit 20 is set to ON by the driver. For example, when the subject vehicle is traveling on a narrow street, the driver switches the mode switching unit 20 to set the system 1 in the pseudo-locus mode (i.e., activate the pseudo-locus mode). In terms of a recently visited destination, it is more recognizable from the travel locus of the subject vehicle on a narrow street than from the travel locus of the same on a broader street. Therefore, when the driver desires to not have a recently visited destination of his/her travel disclosed, the driver may be recommended to use the pseudo-locus mode. In another example, if the driver of the subject vehicle travels to a destination, such as a shopping mall, and the driver of the subject vehicle does not wish for his/her travel locus to reflect his/her travels to the shopping mall, the driver may use the pseudo-locus mode to conceal and prevent disclosure of his/her travel locus to the shopping mall.

The above-mentioned pseudo-locus mode may automatically end (i.e., conclude or terminate) after a predetermined time has elapsed from the start of the pseudo-locus mode. After the pseudo-locus mode has ended, the system 1 is automatically switched to the actual locus mode. Further, instead of a predetermined elapsed time, the end condition for ending the pseudo-locus mode and auto-switching to the actual locus mode may occur after a passing of a predetermined travel distance by the vehicle.

When the above function is set to OFF (S23:No), the process proceeds to Step S24. When the above function is set to ON (S23:Yes), the process proceeds to Step S25. In Step S24, it is determined to adopt the current actual travel locus of the subject vehicle. Then, the process proceeds to Step S26. On the other hand, in Step S25, a pseudo-travel locus is generated. Then, the process proceeds to Step S26.

In Step S26, the vehicle information including a travel locus is generated and the vehicle information is broadcasted from the communication unit 120 toward an outside of the subject vehicle.

Figure 6A:
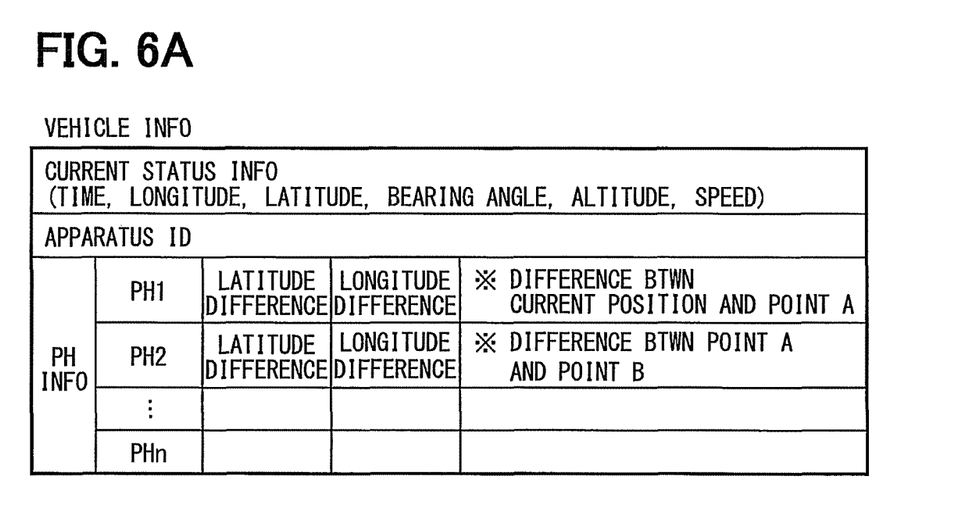
FIG. 6A is a vehicle information diagram.

The vehicle information transmitted in Step S26 is shown in FIG. 6A. The vehicle information includes current status information, an apparatus ID, and PH information. The current status information includes current time and date, current latitude and longitude, a current bearing angle, a current speed and the like.

Figure 6B:
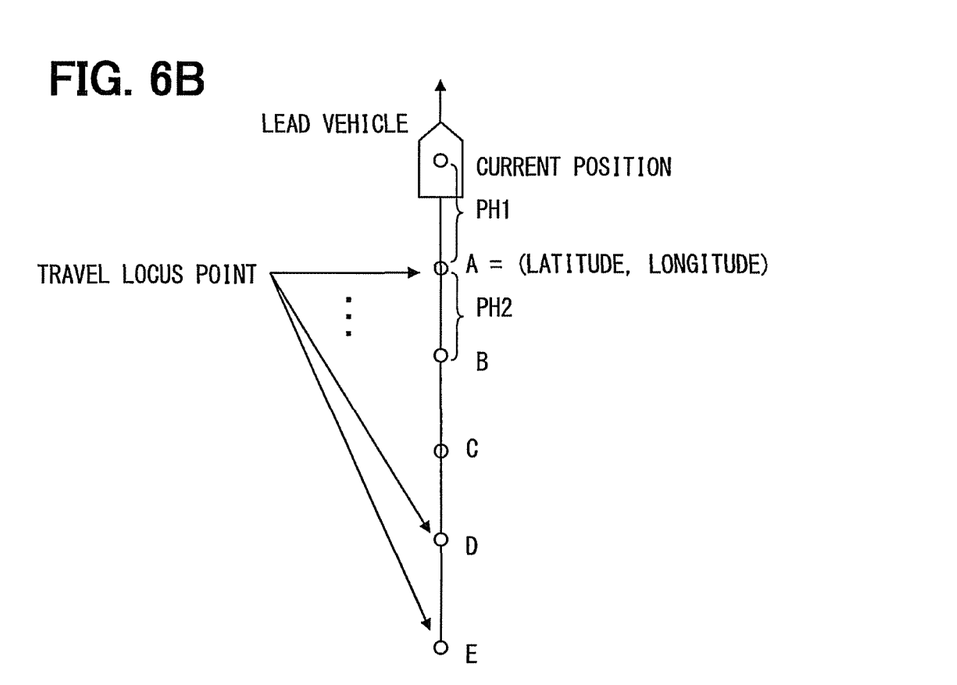
FIG. 6B is an illustration of transmitted vehicle information.

The PH information is information representing a travel locus. Such information enables a determination of the coordinates of points (i.e., designated as travel locus points hereinafter), each of which indicate a vehicle position in the past. FIG. 6B is an illustration of travel locus points, and each of the points A to E is a travel locus point of a lead vehicle. Each travel locus point is identified by longitude and latitude.

The PH information includes plural sets of latitudinal differences and longitudinal differences. The maximum number of such information sets is predetermined. $PH_1$ is a single set of a latitudinal difference and a longitudinal difference between the current position and of the travel locus point A, as shown in FIG. 6A. $PH_2$ is a another set of a latitudinal difference and a longitudinal difference between the travel locus point A and the travel locus point B. Thus, the PH information is a difference between two points (i.e., vehicle positions) at two successive timings at each of which a current position is determined (i.e., a set including the difference between the longitudinal and latitudinal coordinates values of two positions).

In the actual locus mode, the PH information is generated by using as many travel locus points (i.e., actual previous vehicle positions) as possible within the maximum number of information sets described above. The actual previous vehicle positions are memorized in the memory unit 130 by using the position obtainer 112. Among such memorized positions, only the memorized positions after a most recent turning ON of an ignition switch will be used for the generation of the PH information. Therefore, after a sufficient time has elapsed from a turning ON of the ignition switch for generating the PH information having the above-described maximum number of information sets, the PH information having such maximum number of sets is generated. Such PH information having the maximum number of information sets is a representation of an actual travel locus of the subject vehicle for a predetermined amount of time, which is determined based on the coordinates determination cycle and the maximum number of information sets.

Figure 5:
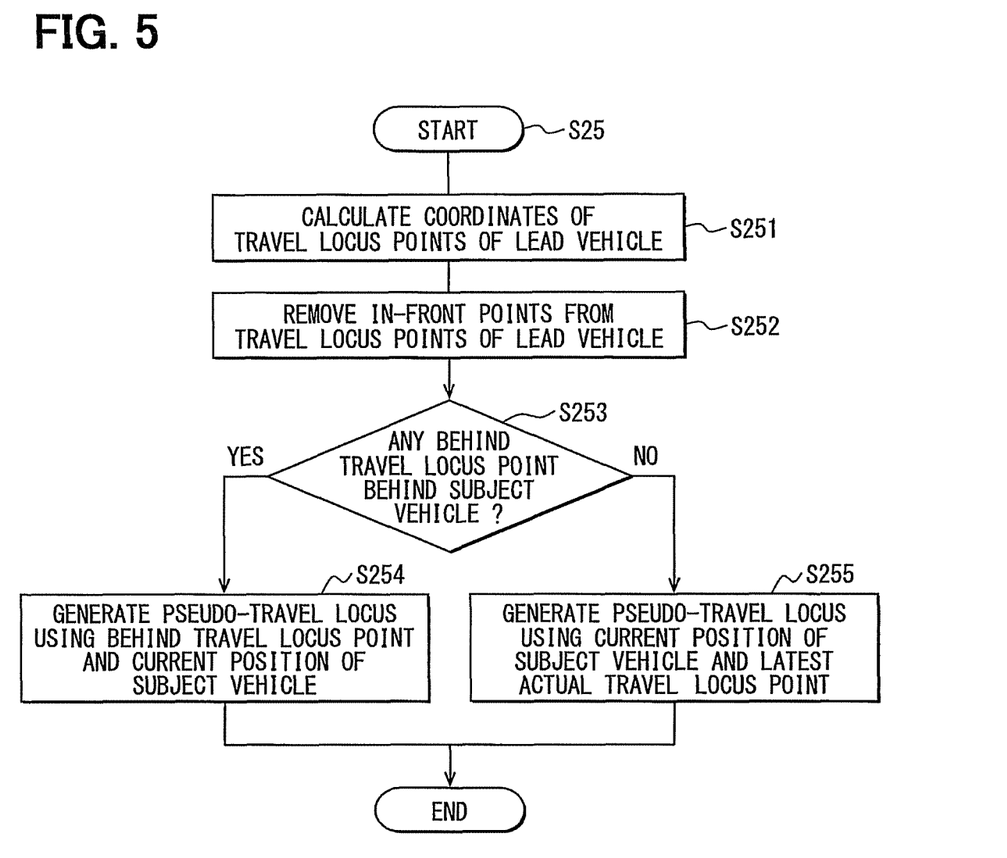
FIG. 5 is a flowchart of a pseudo-travel locus generation process.

On the other hand, the pseudo-travel locus generated in Step S25 after determining that the system 1 is in the pseudo-locus mode, will not use the travel locus points (i.e., the actual previous vehicle positions) or will use a fewer number of travel locus points than the number of such points used in the actual locus mode.

Details of a process of Step S25 are shown in FIG. 5. In Step S251, the coordinates of the travel locus point of a lead vehicle are calculated. More practically, the coordinates of each of the travel locus points of the lead vehicle are calculated by sequentially appending, to the current position of the lead vehicle, each of plural pieces of the PH information in the received vehicle information of the lead vehicle, which has been recognized in Step S22. That is, the travel locus of the lead vehicle may be re-constructed in the above-described manner, by using a latest "current" position in the vehicle information as a base point of a travel locus of the lead vehicle, and by sequentially adding a difference "segment" to the base point based on the PH information.

In Step S252, the process removes any point from among the travel locus points calculated in Step S251, which exists in front of the subject vehicle. The front of the subject vehicle is, in a practical sense, a frontal field of the subject vehicle defined by a line that laterally traverses a center of the subject vehicle along a vehicle width direction. The vehicle width direction of the subject vehicle is determined based on the bearing angle determined by the bearing angle determiner 113.

In Step S253, it is determined whether any travel locus point among the travel locus points of the lead vehicle exists behind the subject vehicle. Such a determination determines whether any one of the travel locus points of the lead vehicle is left un-removed after the process in Step S252. If the determination in Step S253 is Yes, the process proceeds to Step S254. If the determination in Step S253 is No, the process proceeds to Step S255.

Figure 7:
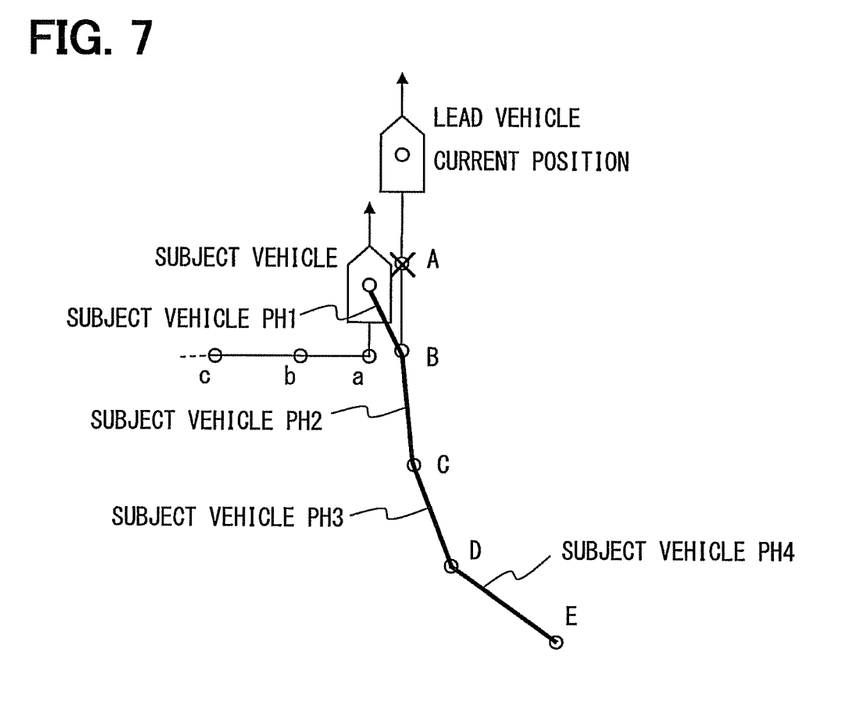
FIG. 7 is an illustration of a pseudo-travel locus generated by using travel locus points of a lead vehicle and the current position of a subject vehicle.

Step S254 is a process of the first pseudo-locus generator 115a for generating a pseudo-travel locus by using (i) a part of the travel locus points of the lead vehicle, which are determined as existing behind the subject vehicle and defined based on the current position of the subject vehicle and the bearing angle of the subject vehicle, and (ii) the current position of the subject vehicle. An example of such a travel locus is shown in FIG. 7. Further, the number of the travel locus points may be greater than 5 points or 6 points, as shown in shown in FIGS. 6 to 8. A fewer number of points is for the purpose of illustration. That is, the number of travel locus points may be more than 10 points or may be more than 20 points.

In FIG. 7, the travel locus points of the lead vehicle are illustrated as points A to E. From among the points A to E, the point A, which is in front of the current position of the subject vehicle, will be removed by the process of Step S252. However, since the point B to the point E are left un-removed as the travel locus points of the subject vehicle, the determination in Step S253 becomes Yes, and a pseudo-travel locus will be generated by using points B to E and the current position of the subject vehicle. As a result, while the actual travel locus points of the subject vehicle are a, b, c, etc. (i.e., for example, locus points to and from a shopping mall), pseudo PH information is, as shown in FIG. 7, set as a subject vehicle $PH_1$, subject vehicle $PH_2$, subject vehicle $PH_3$, and subject vehicle $PH_4$, thereby, concealing and preventing disclosure of the actual travel locus (i.e., locus points to and from a shopping mall).

Step S255 is a process of the second pseudo-locus generator 115b. When performing Step S255, all the travel locus points of the lead vehicle are in front of the subject vehicle, and all travel locus points are removed in Step S252. Therefore, in this Step S255, the pseudo-travel locus is generated by using only two points (i.e., by the current position of the subject vehicle and the latest actual travel locus point).

Figure 8:
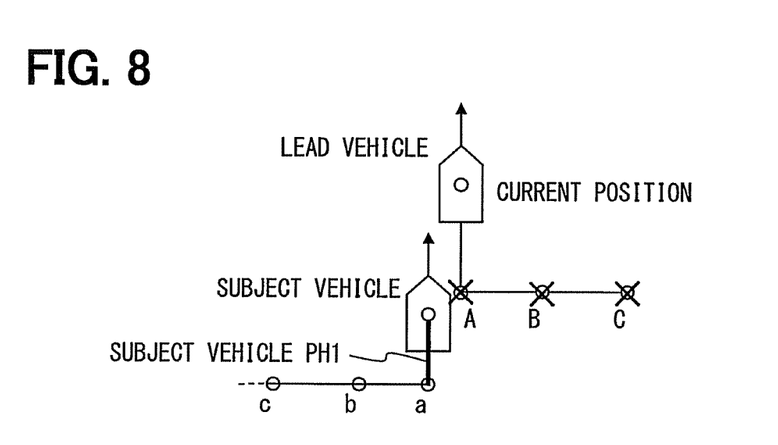
FIG. 8 is an illustration of a pseudo-travel locus generated by using a current position of a subject vehicle and a latest actual travel locus point.

Step S255 is more practically explained with reference to FIG. 8. In an example of FIG. 8, all of the travel locus points A to C of the lead vehicle exist in front of the subject vehicle. Therefore, all of the travel locus points A to C of the lead vehicle will be removed in Step S252. Thus, the pseudo PH information of the subject vehicle $PH_1$ is generated only by using the current position of the subject vehicle and a travel locus point a, which is the latest actual travel locus point of the subject vehicle.

Further, the second pseudo-locus generator 115b may generate the pseudo-travel locus of the subject vehicle from the actual travel locus of the subject vehicle for an amount of time that is less than the predetermined amount of travel time of the subject vehicle, when the travel locus of the lead vehicle does not include travel locus points of the lead vehicle that are behind the subject vehicle.

When a pseudo-travel locus (i.e., pseudo PH information) is generated by performing a process of FIG. 5, the process in Step S26 considers such pseudo PH information as the PH information of the vehicle information shown in FIG. 6. Then, such vehicle information is broadcasted to an outside of the subject vehicle from the communication unit 120.

Other vehicles which have received such vehicle information, including the pseudo PH information, perform a driving support control based on the received travel locus in the same manner as a vehicle which has received the vehicle information including the actual PH information.

As mentioned above, according to the present embodiment, a pseudo-locus generator (115, S25) generates a pseudo-travel locus of the subject vehicle, and a communication controller (116, S26) controls the transmitter 121 to transmit the pseudo-travel locus by including it in the vehicle information, instead of including therein an actual travel locus of the subject vehicle. This pseudo-travel locus is generated from the travel locus points behind the subject vehicle and the current position of the subject vehicle (S254) if such "behind" travel locus points exist in the travel locus points of the lead vehicle (S253:Yes). A unit of the travel locus close to the current position of the subject vehicle in the pseudo-travel locus generated in the above-described manner becomes a similar travel locus to the actual travel locus. The pseudo-travel locus of the subject vehicle may also be generated by using only the current position of the subject vehicle and the latest actual travel locus point a (S255), if none of the travel locus points among the travel locus points of the lead vehicle is behind the subject vehicle (S253:No). Thus, a pseudo-travel locus generated in such manner is an actual travel locus of the subject vehicle in part, (i.e., at a portion that is close to the current position of the subject vehicle), even though such a travel locus is "pseudo" in a sense that the travel locus is not entirely made up of the actual travel locus point b and subsequent points of the subject vehicle, which are removed in step S252 if they exist (i.e., a point b and after).

Therefore, even when the pseudo-travel locus generated in Step S254 or S255 is transmitted by including it in the vehicle information in place of the actual travel locus of the subject vehicle, the nearby vehicles are enabled to perform a driving support control based on the travel locus of the subject vehicle. Further, the subject vehicle is not obliged to transmit its own actual travel locus.

Although the present disclosure has been fully described in connection with the above embodiment thereof with reference to the accompanying drawings, it is to be noted that various changes and modifications will become apparent to those skilled in the art.

(Modification 1)

According to the above-mentioned embodiment, the communication controller 116 is functionally turned ON (i.e., is operated in the pseudo-locus mode), when the mode switching unit 20 is operated by the driver. In this modification 1, the communication controller 116 is operated in the pseudo-locus mode for a predetermined amount of time or for a predetermined distance of travel from a turning ON of the ignition switch. Thereafter, the communication controller 116 is automatically switched to the actual locus mode after an elapse of the predetermined amount of time or a passing of the predetermined distance. In such manner, since the pseudo-locus mode is automatically set for a predetermined amount of time at a start from a certain recently visited destination, transmission of the travel locus of the subject vehicle toward the outside of the subject vehicle, which allows a third party to recognize the recently visited destination of the subject vehicle, is automatically prevented. Further, even in the modification 1, in case that the pseudo-locus mode is generated, the pseudo-locus is included in the vehicle information by performing a process of Step S25. Alternatively, in case that the actual locus mode is generated, the actual travel locus of the subject vehicle is included in the vehicle information by performing a process of Step S24.

Such changes and modifications are to be understood as being within the scope of the present disclosure as defined by the appended claims.

What is claimed is:

1. An in-vehicle apparatus to perform a locus-based travel support control of a subject vehicle based on an actual travel locus of the subject vehicle, the in-vehicle apparatus comprising:
   a communication unit that includes
      a transmitter that transmits a travel locus of the subject vehicle to a plurality of nearby vehicles, and
      a receiver that receives a travel locus of a nearby vehicle from among the plurality of nearby vehicles; and
   an operation unit having a Central Processing Unit (CPU), the CPU in the operation unit executing Read-Only Memory-stored programs to configure the operation unit as
      a position obtainer that obtains a current position of the subject vehicle,
      a lead vehicle recognizer that recognizes one of the plurality of nearby vehicles as a lead vehicle,
      a first pseudo-locus generator that generates a pseudo-travel locus of the subject vehicle based on (i) a travel locus of the lead vehicle that is received by the receiver of the subject vehicle, and (ii) the current position of the subject vehicle in order to maintain privacy for a driver of the subject vehicle,
      a communication controller that transmits, through the transmitter, the pseudo-travel locus of the subject vehicle as the travel locus of the subject vehicle in order to maintain the privacy for the driver of the subject vehicle, and
      a bearing angle determiner that determines a bearing angle of the subject vehicle, wherein
   the operation unit, when configured as the first pseudo-locus generator, generates the pseudo-travel locus of the subject vehicle based on (i) travel locus points of the lead vehicle that are behind the subject vehicle, which are defined based on the current position of the subject vehicle and the bearing angle of the subject vehicle, and (ii) the current position of the subject vehicle, and
   the pseudo-travel locus of the subject vehicle includes the travel locus of the lead vehicle that are behind the current position of the subject vehicle.

2. An in-vehicle apparatus to perform a locus-based travel support control of a subject vehicle based on an actual travel locus of the subject vehicle, the in-vehicle apparatus comprising:
   a communication unit that includes
      a transmitter that transmits a travel locus of the subject vehicle to a plurality of nearby vehicles, and
      a receiver that receives a travel locus of a nearby vehicle from among the plurality of nearby vehicles; and
   an operation unit having a Central Processing Unit (CPU), the CPU in the operation unit executing Read-Only Memory-stored programs to configure the operation unit as
      a position obtainer that obtains a current position of the subject vehicle,
      a lead vehicle recognizer that recognizes one of the plurality of nearby vehicles as a lead vehicle,
      a first pseudo-locus generator that generates a pseudo-travel locus of the subject vehicle based on (i) a travel locus of the lead vehicle that is received by the receiver of the subject vehicle, and (ii) the current position of the subject vehicle,
      a communication controller that transmits, through the transmitter, the pseudo-travel locus of the subject vehicle as the travel locus of the subject vehicle,
      a bearing angle determiner that determines a bearing angle of the subject vehicle, and
      a second pseudo-locus generator that generates the pseudo-travel locus of the subject vehicle from the actual travel locus of the subject vehicle, wherein
   the operation unit, when configured as the first pseudo-locus generator, generates the pseudo-travel locus of the subject vehicle based on (i) travel locus points of the lead vehicle that are behind the subject vehicle, which are defined based on the current position of the subject vehicle and the bearing angle of the subject vehicle, and (ii) the current position of the subject vehicle in order to maintain privacy for a driver of the subject vehicle,
   the communication controller has (i) a pseudo-locus mode in which the pseudo-travel locus of the subject vehicle is transmitted in order to maintain the privacy for the driver of the subject vehicle and (ii) an actual locus mode in which the actual travel locus of the subject vehicle is transmitted,
   the communication controller transmits the actual travel locus of the subject vehicle for a predetermined amount of travel time of the subject vehicle, if the communication controller operates in the actual locus mode,
   the second pseudo-locus generator generates the pseudo-travel locus of the subject vehicle from the actual travel locus of the subject vehicle for an amount of time that is less than the predetermined amount of travel time of the subject vehicle, if the travel locus of the lead vehicle does not include travel locus points of the lead vehicle that are behind the subject vehicle, and the communication controller transmits the pseudo-travel locus of the subject vehicle if the pseudo-travel locus of the subject vehicle is generated by either of the first or second pseudo-locus generator while the communication controller operates in the pseudo-locus mode to maintain the privacy for the driver of the subject vehicle.

3. The in-vehicle apparatus of claim 2, further comprising:
a mode switching unit connected to the operation unit, the mode switching unit configured to select one of the pseudo-locus mode or the actual locus mode, wherein
the communication controller transmits (i) the pseudo-travel locus of the subject vehicle if the communication controller operates in the pseudo-locus mode, and (ii) the actual travel locus of the subject vehicle if the communication controller operates in the actual locus mode.

4. An in-vehicle apparatus to perform a locus-based travel support control of a subject vehicle based on an actual travel locus of the subject vehicle, the in-vehicle apparatus comprising:
a communication unit that includes
a transmitter that transmits a travel locus of the subject vehicle to a plurality of nearby vehicles, and
a receiver that receives a travel locus of a nearby vehicle from among the plurality of nearby vehicles; and
an operation unit having a Central Processing Unit (CPU), the CPU in the operation unit executing Read-Only Memory-stored programs to configure the operation unit as
a position obtainer that obtains a current position of the subject vehicle,
a lead vehicle recognizer that recognizes one of the plurality of nearby vehicles as a lead vehicle,
a first pseudo-locus generator that generates a pseudo-travel locus of the subject vehicle based on (i) a travel locus of the lead vehicle that is received by the receiver of the subject vehicle, and (ii) the current position of the subject vehicle in order to maintain privacy for a driver of the subject vehicle, and
a communication controller transmits, through the transmitter, the pseudo-travel locus of the subject vehicle as the travel locus of the subject vehicle to maintain the privacy for the driver of the vehicle, wherein
the operation unit, when configured as the communication controller has (i) a pseudo-locus mode in which the pseudo-travel locus of the subject vehicle is transmitted and (ii) an actual locus mode in which an actual travel locus of the subject vehicle is transmitted,
the operation unit, when configured as the communication controller operates in the pseudo-locus mode, from a turning ON of an ignition switch, for a predetermined amount of travel time or a predetermined travel distance, and is automatically switched to the actual locus mode after an elapse of the predetermined amount of travel time or a passing of the predetermined travel distance, and
the operation unit, when configured as the communication controller transmits (i) the pseudo-travel locus of the subject vehicle when the communication controller operates in the pseudo-locus mode, and (ii) the actual travel locus of the subject vehicle when the communication controller operates in the actual locus mode.

5. A method for performing a locus-based travel support control of a subject vehicle based on an actual travel locus of the subject vehicle, the method comprising:
receiving a travel locus of a nearby vehicle from among a plurality of nearby vehicles at a receiver; and
configuring an operation unit, by a Central Processing Unit (CPU) located in the operation unit to
obtain a current position of the subject vehicle,
recognize one of the plurality of nearby vehicles as a lead vehicle,
generate a pseudo-travel locus of the subject vehicle based on (i) a travel locus of the lead vehicle that is received by the subject vehicle, and (ii) the current position of the subject vehicle in order to maintain privacy for a driver of the vehicle,
transmit the pseudo-travel locus of the subject vehicle as the travel locus of the subject vehicle in order to maintain the privacy for the driver of the subject vehicle, and
determining a bearing angle of the subject vehicle, wherein
the pseudo-travel locus of the subject vehicle is generated based on (i) travel locus points of the lead vehicle that are behind the subject vehicle, which are defined based on the current position of the subject vehicle and the bearing angle of the subject vehicle, and (ii) the current position of the subject vehicle, and
the pseudo-travel locus of the subject vehicle includes the travel locus of the lead vehicle that exists behind the current position of the subject vehicle.

6. A method for performing a locus-based travel support control of a subject vehicle based on an actual travel locus of the subject vehicle, the method comprising:
receiving a travel locus of a nearby vehicle from among a plurality of nearby vehicles at a receiver; and
configuring an operation unit, by a Central Processing Unit (CPU) located in the operation unit to
obtain a current position of the subject vehicle,
recognize one of the plurality of nearby vehicles as a lead vehicle,
generate a pseudo-travel locus of the subject vehicle based on (i) a travel locus of the lead vehicle that is received by the subject vehicle, and (ii) the current position of the subject vehicle in order to maintain privacy for a driver of the subject vehicle,
transmit the pseudo-travel locus of the subject vehicle as the travel locus of the subject vehicle in order to maintain the privacy for the driver of the subject vehicle,
determine a bearing angle of the subject vehicle,
generate the pseudo-travel locus of the subject vehicle from the actual travel locus of the subject vehicle from (i) a pseudo-locus mode in which the pseudo-travel locus of the subject vehicle is transmitted or (ii) an actual locus mode in which the actual travel locus of the subject vehicle is transmitted,
transmit the actual travel locus of the subject vehicle for a predetermined amount of travel time of the subject vehicle, if the pseudo-travel locus of the subject vehicle is generated while operating in the actual locus mode,
generate the pseudo-travel locus of the subject vehicle from the actual travel locus of the subject vehicle for an amount of time that is less than the predetermined amount of travel time of the subject vehicle, if the travel locus of the lead vehicle does not include travel locus points of the lead vehicle that are behind the subject vehicle, and
control the transmitter to transmit the pseudo-travel locus of the subject vehicle if the pseudo-travel locus of the subject vehicle is generated by either of the first or second pseudo-locus generator and while the pseudo-travel locus of the subject vehicle is generated while operating in the pseudo-locus mode to maintain the privacy for the driver of the subject vehicle, wherein the pseudo-travel locus of the subject vehicle is generated based on (i) travel locus points of the lead vehicle that are behind the subject vehicle, which are defined based on the current position of the subject vehicle and the bearing angle of the subject vehicle, and (ii) the current position of the subject vehicle.

7. The method of claim 6, further comprising:
configuring a mode switching unit to selecting one of the pseudo-locus mode or the actual locus mode; and
configuring the operation unit to transmitting (i) the pseudo-travel locus of the subject vehicle if the pseudo-travel locus of the subject vehicle is generated while operating in the pseudo-locus mode, or (ii) the actual travel locus of the subject vehicle if the pseudo-travel locus of the subject vehicle is generated while operating in the actual locus mode.

8. A method for performing a locus-based travel support control of a subject vehicle based on an actual travel locus of the subject vehicle, the method comprising:
receiving a travel locus of a nearby vehicle from among a plurality of nearby vehicles at a receiver; and
configuring an operation unit, by Central Processing Unit (CPU) located in the operation unit to
obtain a current position of the subject vehicle,
recognize one of the plurality of nearby vehicles as a lead vehicle,
generate a pseudo-travel locus of the subject vehicle based on (i) a travel locus of the lead vehicle that is received by the subject vehicle, and (ii) the current position of the subject vehicle in order to maintain privacy for a driver of the subject vehicle,
transmit the pseudo-travel locus of the subject vehicle as the travel locus of the subject vehicle in order to maintain the privacy for the driver of the subject vehicle,
generate the pseudo-travel locus of the subject vehicle from the actual travel locus of the subject vehicle from (i) a pseudo-locus mode in which the pseudo-travel locus of the subject vehicle is transmitted or (ii) an actual locus mode in which the actual travel locus of the subject vehicle is transmitted,
operate in the pseudo-locus mode, from a turning ON of an ignition switch, for a predetermined amount of travel time or a predetermined travel distance, and automatically switching to the actual locus mode after an elapse of the predetermined amount of travel time or a passing of the predetermined travel distance, and transmit (i) the pseudo-travel locus of the subject vehicle when generating the pseudo-travel locus of the subject vehicle in the pseudo-locus mode to maintain the privacy for the driver of the subject vehicle, or (ii) the actual travel locus of the subject vehicle when generating the pseudo-travel locus of the subject vehicle in the actual locus mode.

9. The in-vehicle apparatus of claim 1, wherein the pseudo-travel locus of the subject vehicle generated by the first pseudo-locus generator includes only the travel locus of the lead vehicle that are behind the subject vehicle and the current position of the subject vehicle.

10. The in-vehicle apparatus of claim 1, wherein the pseudo-travel locus of the subject vehicle generated by the first pseudo-locus generator is generated without using the entire actual travel locus of the subject-vehicle.

11. The in-vehicle apparatus of claim 2, wherein the actual travel locus of the subject vehicle includes a plurality of locations of the subject vehicle and the pseudo-travel locus of the subject vehicle generated by the second pseudo-locus generator includes only one of the plurality of locations and the current position of the subject vehicle.

12. The in-vehicle apparatus of claim 11, wherein the one of the plurality of locations is a location nearest the current position of the subject vehicle.

13. The in-vehicle apparatus of claim 5, wherein the pseudo-travel locus of the subject vehicle includes only the travel locus of the lead vehicle that is behind the subject vehicle and the current position of the subject vehicle.

14. The in-vehicle apparatus of claim 5, wherein the pseudo-travel locus of the subject vehicle is generated without using the entire actual travel locus of the subject-vehicle.

15. The in-vehicle apparatus of claim 6, wherein the actual travel locus of the subject vehicle includes a plurality of positions of the subject vehicle and if the travel locus of the lead vehicle does not include travel locus points of the lead vehicle that are behind the subject vehicle, the pseudo-locus of the subject vehicle includes only one of the plurality of locations of the subject vehicle and the current position of the vehicle.

16. The in-vehicle apparatus of claim 15, wherein the one of the plurality of locations is a location nearest the current position of the subject vehicle.

17. The in-vehicle apparatus of claim 1, wherein the actual travel locus of the subject vehicle and the pseudo-travel locus of the subject vehicle are in the same coordinate system.

18. The in-vehicle apparatus of claim 5, wherein the actual travel locus of the subject vehicle and the pseudo-travel locus of the subject vehicle are in the same coordinate system.

* * * * *